(No Model.) 2 Sheets—Sheet 2.

F. A. STIMSON.
HORSE BOOT.

No. 547,044. Patented Oct. 1, 1895.

Witnesses:
C. E. VanDorn.
Richard Paul

Inventor:
Frank A. Stimson.
By Paul O. Hawley
his Attorneys;

UNITED STATES PATENT OFFICE.

FRANK A. STIMSON, OF MINNEAPOLIS, MINNESOTA, ASSIGNOR OF ONE-HALF TO MARTIN L. BURKHART, OF SAME PLACE.

HORSE-BOOT.

SPECIFICATION forming part of Letters Patent No. 547,044, dated October 1, 1895.

Application filed February 23, 1895. Serial No. 539,349. (No model.)

*To all whom it may concern:*

Be it known that I, FRANK A. STIMSON, of the city of Minneapolis, county of Hennepin, State of Minnesota, have invented certain new and useful Improvements in Quarter-Boots, of which the following is a specification.

My invention relates to quarter-boots designed for use on the fore leg of a horse below the fetlock joint; and the primary object of my invention is to provide a boot having a single strap, which, when drawn up, will simultaneously draw the upper and lower edge of the boot closely around the hoof and foot of the horse, and a further object is to provide a cover or protection to prevent injury to the hoof and foot and to obviate the danger of the shoe being pulled off in case the horse overreaches.

My invention consists, generally, in the constructions and combinations, all as hereinafter described, and particularly pointed out in the claims.

The invention will be more readily understood by reference to the accompanying drawings, forming part of this specification, in which—

Figure 1:
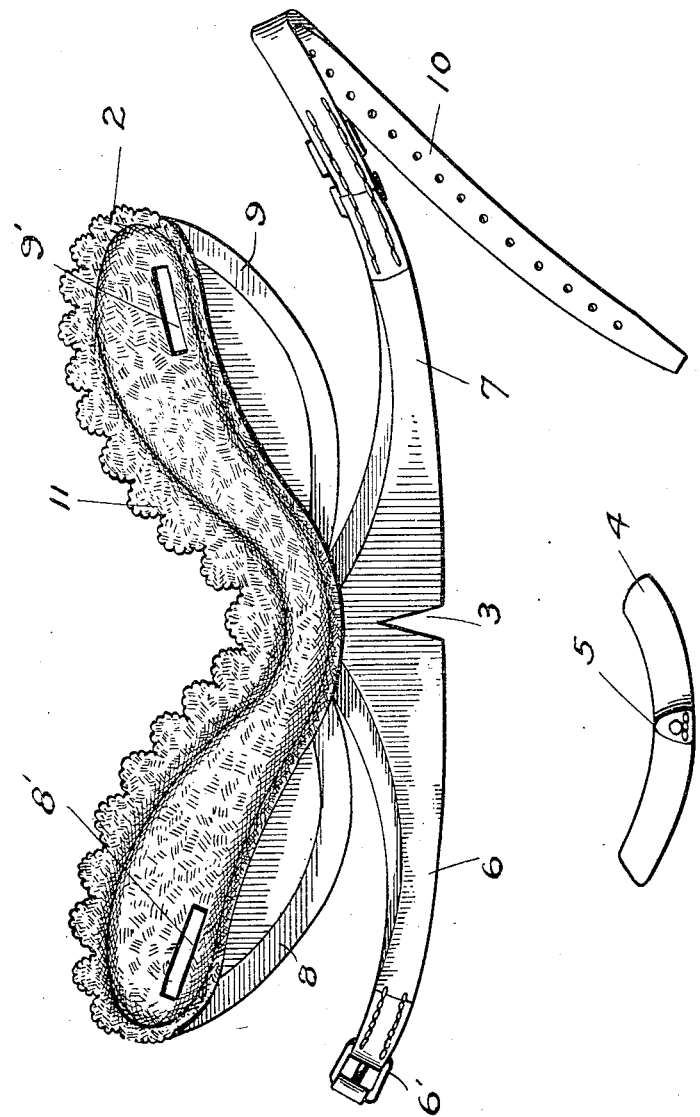
Figure 2:
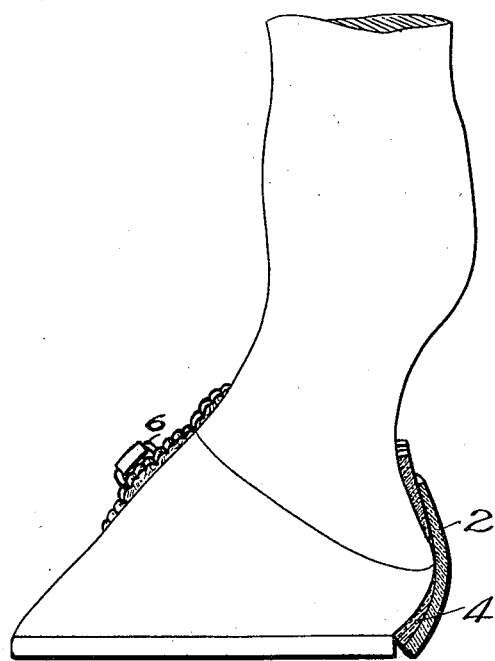
Figure 3:
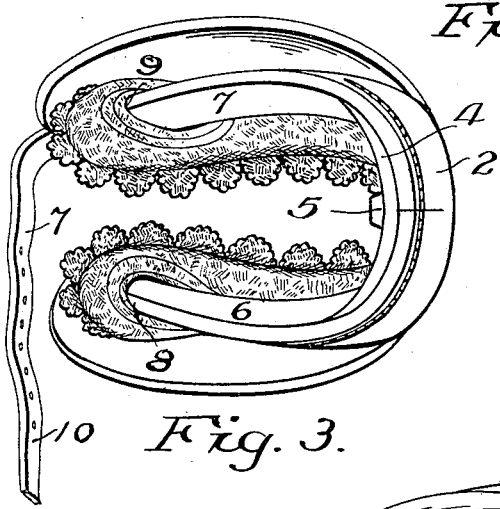
Figure 4:
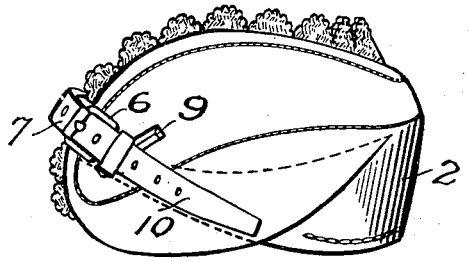
Figure 5:
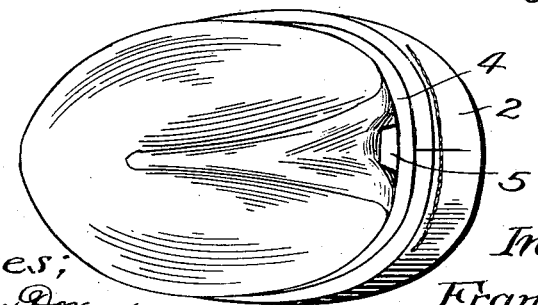

Figure 1 is a plan view showing the inside of the boot. Fig. 2 is a side view showing the boot upon the horse's foot, the rear portion being shown in section. Fig. 3 is a view looking at the under side of the boot, showing the interior thereof. Fig. 4 is a side view of the same. Fig. 5 is a view looking at the under side of Fig. 2. Fig. 6 is a detail of the part used to stiffen the heel of the boot.

In the accompanying drawings, 2 represents the main portion of the boot, which is stamped out from a single piece of any suitable material, preferably leather, and shaped to fit closely over and around the heel and coronet, thereby offering complete protection for that portion of the foot in case the horse overreaches or whenever the foot is liable to be injured in any way. The lower rear edge of the part 2 is provided with a gore 3, as shown clearly in Fig. 1, and beginning at a point just above the gored portion the part 2 is cut in either direction, forming the straps 6 and 7 and the parts 8 and 9, as shown in Fig. 1. After the part 2 is cut, as above described, the edges of the gored portion 3 are brought together and sewed, and over this gored portion is secured the strap or part 4, having the part 5 secured near its central portion to fit into the depression of the hoof, for the purpose hereinafter described.

The strap 6 is provided at its outer extremity with a suitable buckle 6', and the strap 7 is provided at its extremity with the rawhide strap 10. The parts 8 and 9 are each provided with a slot 8' and 9' near their outer ends, through which is passed, respectively, the ends of the straps 6 and 7.

The upper portion of the boot is provided with the lining 11, secured to the interior in any suitable manner and projecting above the upper edge of the boot and thereby preventing the hard edge of the boot from chafing the horse's foot. The soft lining fitting closely around the foot prevents the sand and wet from getting down into the interior of the boot, and the hoof is, therefore, always kept clean and dry. The rear portion of the boot is cut down to fit closely around the foot and the lining prevents the same from being chafed.

When it is desired to use the boot, the main portion 2 is placed on the hoof, so that the part 5 will fit into the depression heretofore mentioned, and thereby the boot will be prevented from slipping in either direction. The straps 6 and 7 are then drawn up closely, which causes the upper and lower edges of a rear portion of the boot to be drawn in around the horse's foot simultaneously, for as the straps pass through the openings 8' and 9' and are drawn up they necessarily draw up on the parts 8 and 9, thereby drawing in the upper edge of the boot as well as the lower. With this construction I am able to do away with the use of several straps, thereby greatly simplifying the boot and lessening the expense of manufacture.

The boot may be stamped out from a single piece of leather or other suitable material, and its shape may be varied considerably without departing from the spirit of my invention.

Having thus described my invention, I claim as new and desire to secure by Letters Patent—

1. In a quarter boot, the combination, of the heel or lower portion, forming a guard for the rear of the foot, the upper portion, a single strap carried by said heel portion and loosely connected to said upper portion, whereby when said strap is drawn up, the upper edge of said upper portion and the lower edge of said heel portion will be drawn forward closely around the horse's hoof and foot, substantially as described.

2. A quarter boot, made from a single bifurcated piece of leather or other suitable material, and comprising a stiffened heel portion having tongues or straps, an upper yoke shaped flexible portion connected to said heel portion at the rear of the boot, and said flexible portion being provided with slots or openings to receive said tongues or straps, whereby when the ends of the same are drawn together the upper edge of the flexible portion and the lower edge of the heel portion will be contracted simultaneously, substantially as described.

3. A quarter boot, comprising the heel or inflexible portion forming a guard for the rear of the foot, the upper flexible portion arranged to encircle the foot of the horse, said flexible portion being provided with slots or openings, and said heel portion being provided with straps or extensions adapted to pass through said openings respectively, whereby when the free ends of said straps are drawn together the upper edge of said flexible portion and the lower edge of the heel portion will simultaneously be drawn around the horse's hoof and foot, substantially as described.

4. A quarter boot, composed of a belt or apron of leather or other suitable material, and comprising the upper portion 2, said upper portion having parts 8 and 9 provided with slots 8' and 9' to receive said straps, whereby when said straps are drawn up the upper and lower edges of the boot will be drawn closely around the horse's hoof and foot, substantially as described.

5. A horse boot consisting of the main or upper portion, and a gored lower portion, said gored portion being provided with the stiff portion 4, the clip 5 and the reduced extensions 6 and 7, said main portion having parts 8 and 9 provided with slots 8' and 9' to receive said reduced extensions, the lining 11 and the strap 10 connecting said reduced extensions, for the purpose set forth.

In testimony whereof I have hereunto set my hand this 2d day of January, A. D. 1895.

FRANK A. STIMSON.

In presence of—
C. G. HAWLEY,
RICHARD PAUL.